Patented Jan. 4, 1944

2,338,459

UNITED STATES PATENT OFFICE 2,338,459

PROCESS FOR PRODUCING VINYL CHLORIDE

Erich Schaeffer, Burghausen, Germany; vested in the Alien Property Custodian

No Drawing. Application October 12, 1940, Serial No. 361,009. In Germany October 17, 1939

7 Claims. (Cl. 260—656)

This invention relates to the production of vinyl chloride and has for its object to provide a new and improved process for this purpose.

It is known to pass a mixture of acetylene and hydrochloric acid gas over mercury compounds, for instance mercury chloride, at elevated temperatures, for the purpose of producing vinyl chloride in the vapor phase. During the conversion the mercury compounds are reduced to mercury, which sublimates out of the reaction chamber, so that the catalyst has only a very short life. With other known catalysts, for example compounds of zinc, aluminum, iron and of metals of the second and fifth groups of the periodic system, the conversions are considerably less, and considerably higher reaction temperatures are required in order to start the conversion at all. The effect of these catalysts deteriorates too quickly for technical purposes and they also promote the formation of by-products, for instance ethylidene bichloride.

I have found that of the last-mentioned known catalysts, the chlorides of alkaline earth metals, and mixtures thereof, particularly chloride of strontium, chloride of barium, chloride of calcium, have imparted to them a considerably increased effectiveness and longer life when there is incorporated in them small quantities of mercury compounds, for instance mercury chloride. In comparison with other metallic chlorides, these novel catalysts lead substantially only to the formation of vinyl chloride, while undesirable by-products, such as ethylidene bichloride, do not generate to any appreciable extent. It is surprising that the mercury compounds remain in the catalyst, so that the favorable conversion conditions are maintained for a long period, as much as 1000 hours and more. In general a content of 0.1-2% mercury salt is sufficient in the catalyst. Reaction temperatures of over 120° C. are preferable, which may be increased during the reaction to something like 250° C. in case the conversion drops.

The introduced gas mixture may consist of 1 mol of acetylene and 1 mol of hydrochloric acid gas. However, acetylene can also be advantageously used in excess up to about four-fold, the excess acetylene being returned to the reaction zone upon the separation of the vinyl chloride. Super-atmospheric pressure may be used in the conversion. The catalyst is used either alone or preferably when charged upon porous carriers, particularly those with high surface activity, such as activated charcoal, silica gel, and the like. In the production of the catalyst the procedure followed is that, for example, 0.1-0.2% mercury chloride is mixed with a hot aqueous solution saturated for instance with barium chloride. The water is then removed by evaporation. The solution can also be mixed with other substances known as catalysts. When porous carriers are used, these are saturated with the solution and the water is then removed.

*Example 1*

Highly activated charcoal or silica gel is soaked with a hot saturated solution of barium chloride, which contains 0.2% mercury chloride, and is then dried. At a temperature of 160-250° C., a gaseous mixture of 200 litres of acetylene and 120 litres of hydrochloric acid gas is passed per hour through a reaction chamber of a volume of 6 litres filled with the catalyst. 300-330 g. vinyl chloride is obtained per hour, which is separated in the conventional manner from the acetylene by washing with solvents or by absorption with activated charcoal or by cooling. Only after 500 hours does the conversion drop by about 30%. Without a content of mercury chloride in the catalyst a higher temperature is necessary and after only 200 hours the conversion is reduced to less than one-half of the above-indicated quantities of vinyl chloride.

*Example 2*

Activated charcoal is saturated with a solution which contains about 20% calcium chloride, 10% barium chloride and 1% mercury chloride. A gaseous mixture of 6 cubic meters of acetylene and 3-4 cubic meters of hydrochloric acid gas is passed per hour through a reaction chamber of a volume of 160 litres filled with the catalyst, at a temperature of 120° C. In this case 8-9 kilos of vinyl chloride are produced per hour, the vinyl chloride being separated in the usual manner from the excess acetylene, and the acetylene is returned into the reaction chamber. If the catalyst contains no mercury salt, no reaction takes place at 120° C. at all.

The invention claimed is:

1. Process for producing vinyl chloride which comprises heating a mixture of acetylene and hydrochloric acid gas in the presence of a catalyst consisting of a chloride of an alkaline earth metal and 0.1 to 2% of mercury chloride.

2. Process for producing vinyl chloride which comprises heating a mixture of acetylene and hydrochloric acid gas in the presence of a catalyst consisting of a chloride of an alkaline earth metal and 0.1 to 2% of mercury chloride, characterized by the fact that the acetylene is used in an excess up to four times the amount of hydrochloric acid gas employed.

3. Process for producing vinyl chloride which comprises heating a mixture of acetylene and hydrochloric acid gas to a temperature of 120 to 250° C. in the presence of a catalyst consisting of a chloride of an alkaline earth metal and 0.1 to 2% of mercury chloride, characterized by the fact that the acetylene is used in an excess up to four times the amount of hydrochloric acid gas employed.

4. Process for producing vinyl chloride which comprises heating a mixture of acetylene and hydrochloric acid gas to a temperature of 120 to 250° C. in the presence of a catalyst consisting of a chloride of an alkaline earth metal and 0.1 to 2% of chloride of mercury.

5. Process for producing vinyl chloride which comprises heating a mixture of acetylene and hydrochloric acid gas to a temperature of 120 to 250° C. in the presence of a catalyst consisting of barium chloride and 0.1 to 2% mercury chloride.

6. Process for producing vinyl chloride which comprises heating a mixture of acetylene and hydrochloric acid gas to a temperature of 120 to 250° C. in the presence of a catalyst consisting of the following ingredients in substantially the following proportions: calcium chloride 20%, barium chloride 10% and mercury chloride 1%.

7. Process for producing vinyl chloride which comprises continuously passing acetylene and hydrochloric acid gas at a temperature of 120 to 250° C. through a reaction chamber in contact with a porous carrier impregnated with a catalyst consisting of chloride of an alkaline earth metal and a 0.1 to 2% of mercury chloride.

ERICH SCHAEFFER.